(No Model.) 8 Sheets—Sheet 1.

J. H. LASKEY.
LASTING MACHINE.

No. 353,145. Patented Nov. 23, 1886.

WITNESSES. INVENTOR.

(No Model.) 8 Sheets—Sheet 2.
J. H. LASKEY.
LASTING MACHINE.

No. 353,145. Patented Nov. 23, 1886.

WITNESSES.
James T. Prince
Edwin G. Alexander

INVENTOR.
John H. Laskey
by H. H. Spencer
Attorney (No Model.)

8 Sheets—Sheet 5.

J. H. LASKEY.
LASTING MACHINE.

No. 353,145. Patented Nov. 23, 1886.

Witnesses:

Inventor:
John H. Laskey
by N. H. Spencer
attorney (No Model.) 8 Sheets—Sheet 6.
J. H. LASKEY.
LASTING MACHINE.

No. 353,145. Patented Nov. 23, 1886.

WITNESSES. INVENTOR.

(No Model.) 8 Sheets—Sheet 7.
J. H. LASKEY.
LASTING MACHINE.
No. 353,145. Patented Nov. 23, 1886.
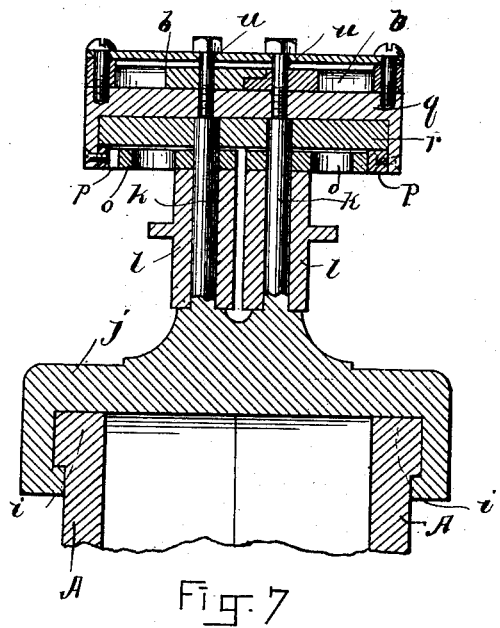
Fig. 7
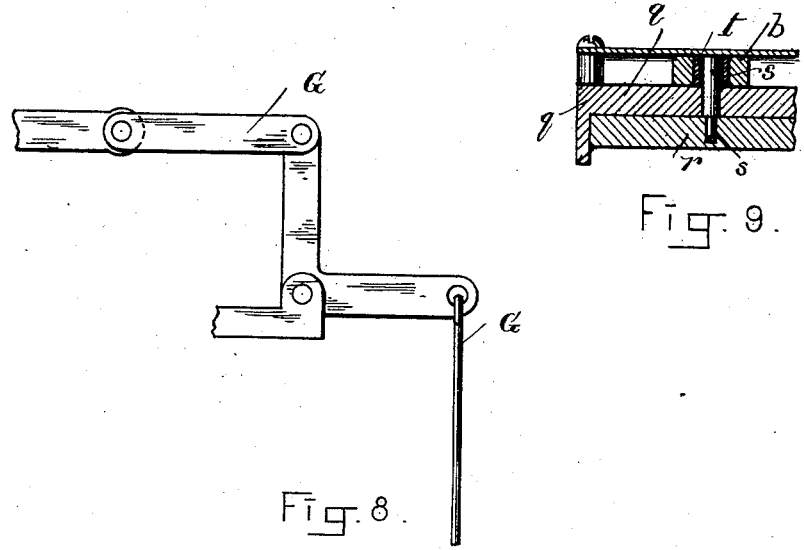
Fig. 8.
Fig. 9.
WITNESSES.
James P. Grinee
Edwin G. Alexander
INVENTOR.
John H. Laskey
by A. H. Krewer
Attorney (No Model.) 8 Sheets—Sheet 8.

J. H. LASKEY.
LASTING MACHINE.

No. 353,145. Patented Nov. 23, 1886.

WITNESSES.
INVENTOR.

UNITED STATES PATENT OFFICE.

JOHN H. LASKEY, OF BOSTON, MASSACHUSETTS, ASSIGNOR, BY DIRECT AND MESNE ASSIGNMENTS, TO ISAAC F. DOBSON, JOSEPH F. REYNOLDS, AND EDWARD E. REYNOLDS, ALL OF SAME PLACE.

LASTING-MACHINE.

SPECIFICATION forming part of Letters Patent No. 353,145, dated November 23, 1886.

Application filed June 16, 1886. Serial No. 205,327. (No model.)

*To all whom it may concern:*

Be it known that I, JOHN H. LASKEY, of Boston, in the county of Suffolk and State of Massachusetts, have invented certain new and useful Improvements in Lasting-Machines, of which the following, taken in connection with the accompanying drawings, is a specification.

My invention embodies various improvements in lasting-machines, designed to simplify and materially cheapen such mechanism, to lessen their size and number of parts, to increase their speed, and otherwise perfect their action, and, finally, to render unnecessary the use of steam-power. I thus adapt my machines to home use and to small shops where power is not available, enabling work of this sort to compete favorably with that done in large establishments. The advantage of hand manipulation in using a lasting-machine is obvious from the superior sensitiveness of touch which enables the operator to adapt the mechanism to the varying conditions of the stock, which cannot be done in power-machines alone.

My invention consists in the devices and combinations of devices herein illustrated and described, and especially referred to in the appended claims.

For convenience of description my improvements will be considered in the following order: first, the body of the machine, with the mechanism which supports and elevates the last; second, the swinging head with its grippers and pressure mechanism; third, the laterally-sliding clamps and the swinging clamp-jaws with actuating devices; fourth, the general operation of the machine in the process of lasting a shoe.

Figure 1:
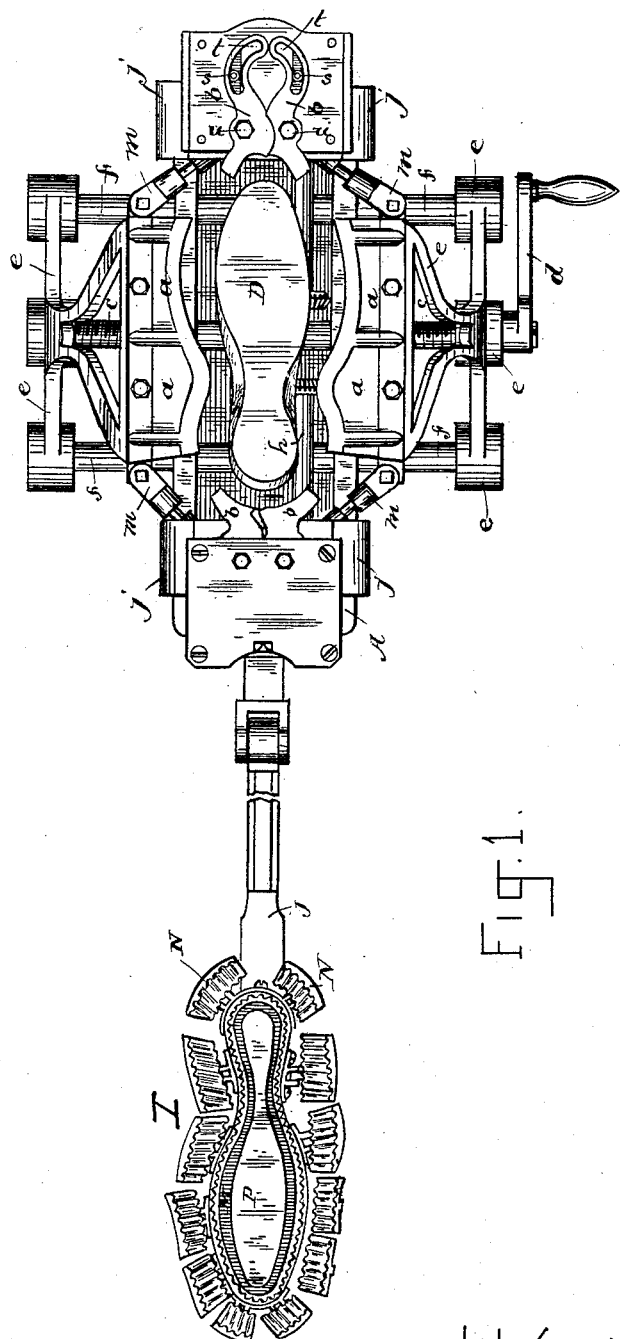
Figure 11:
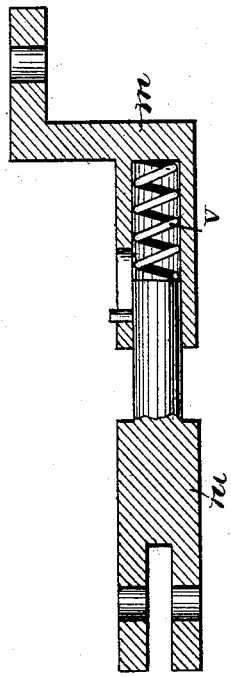
Figure 2:
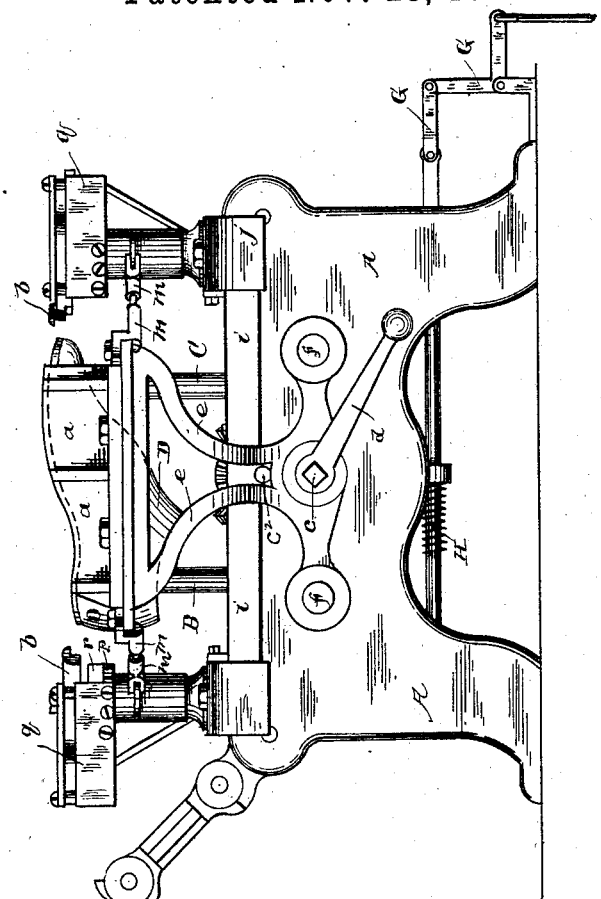
Figure 2:
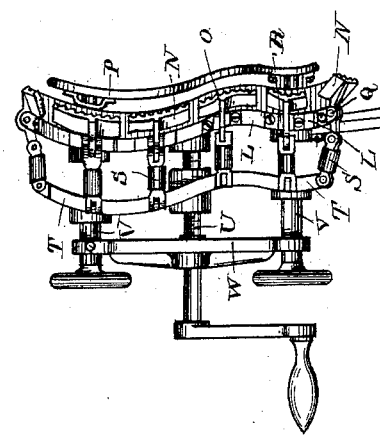
Figure 3:
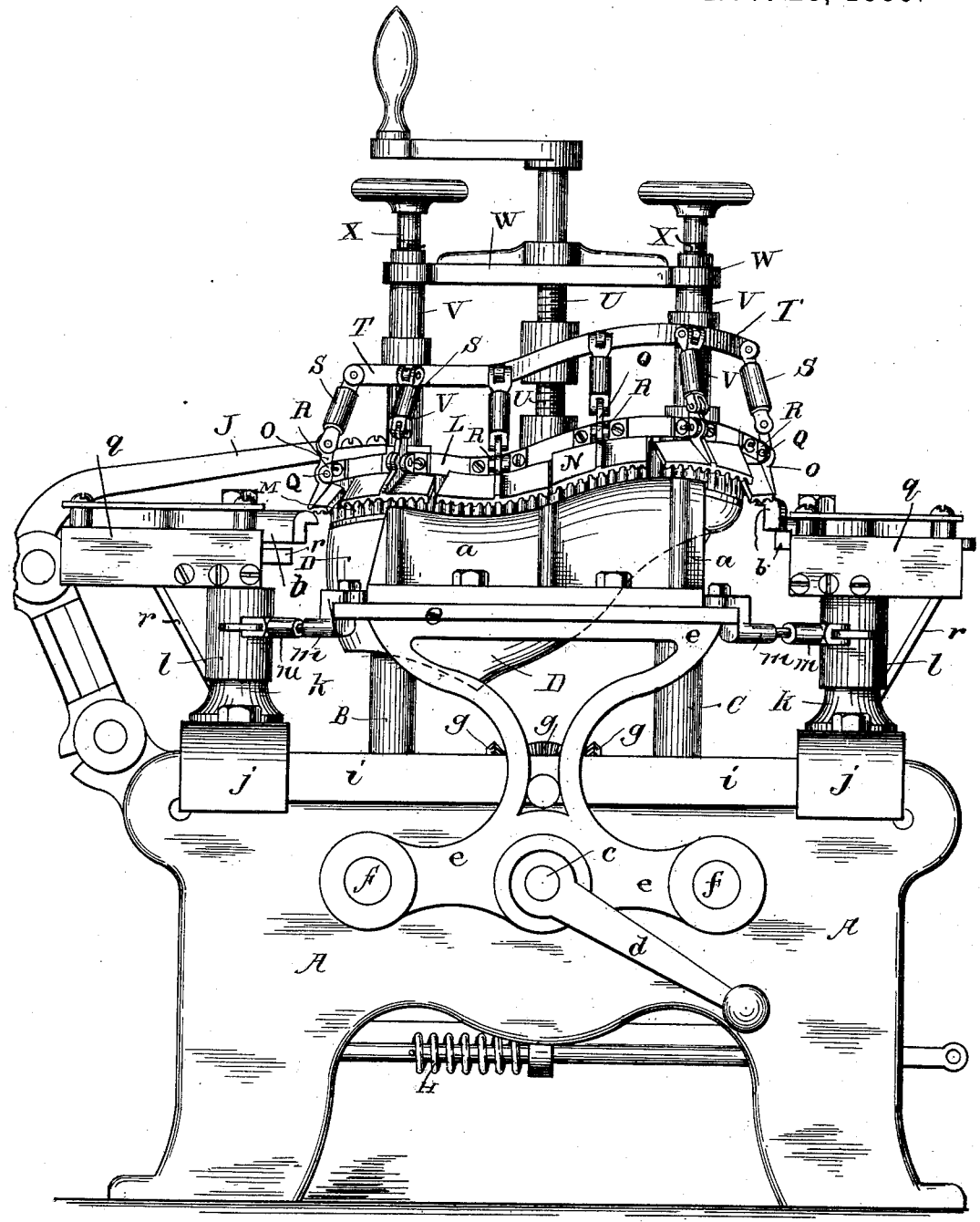
Figure 4:
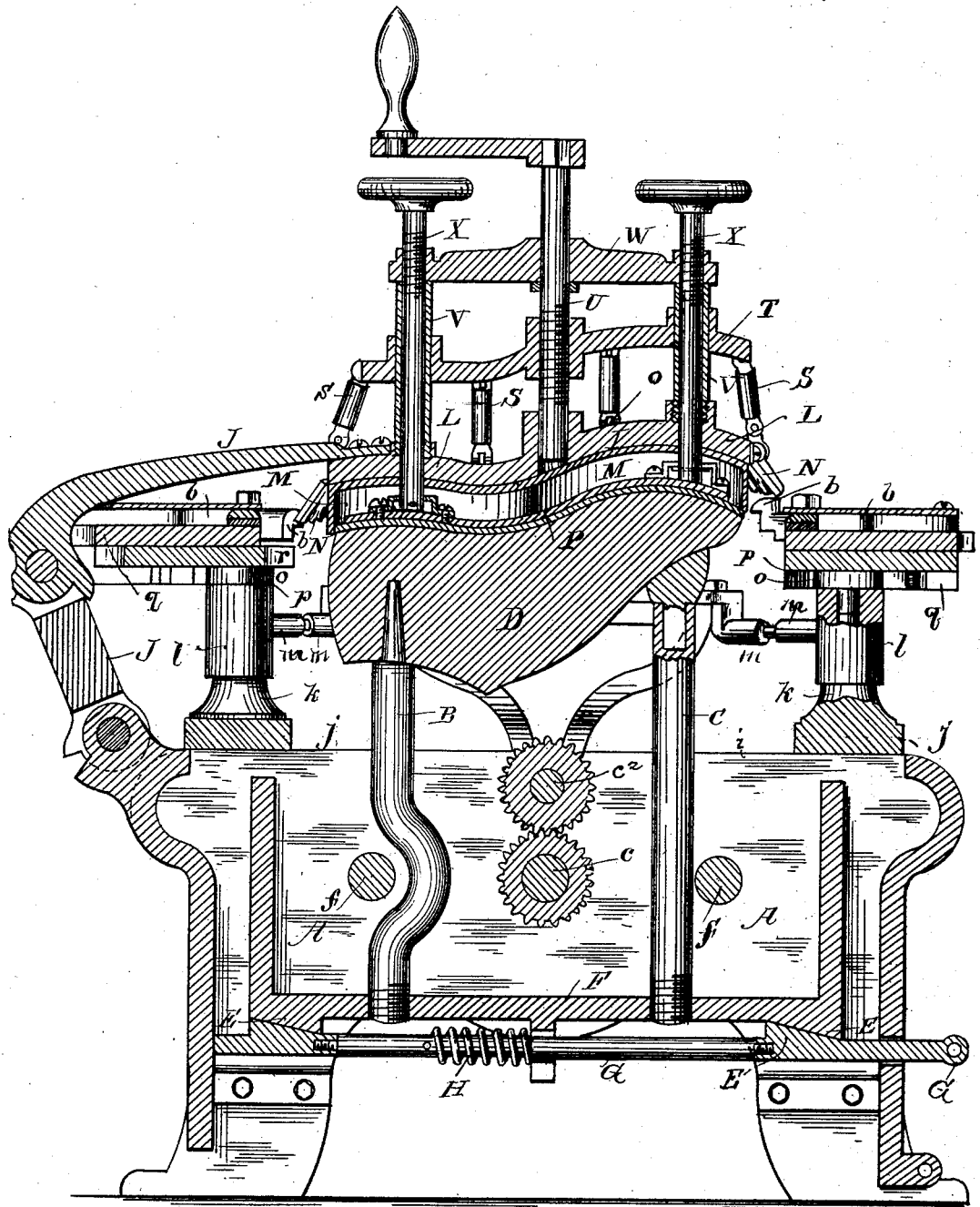
Figure 12:
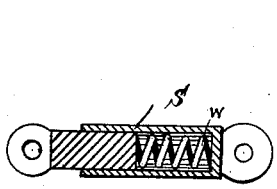
Figure 5:
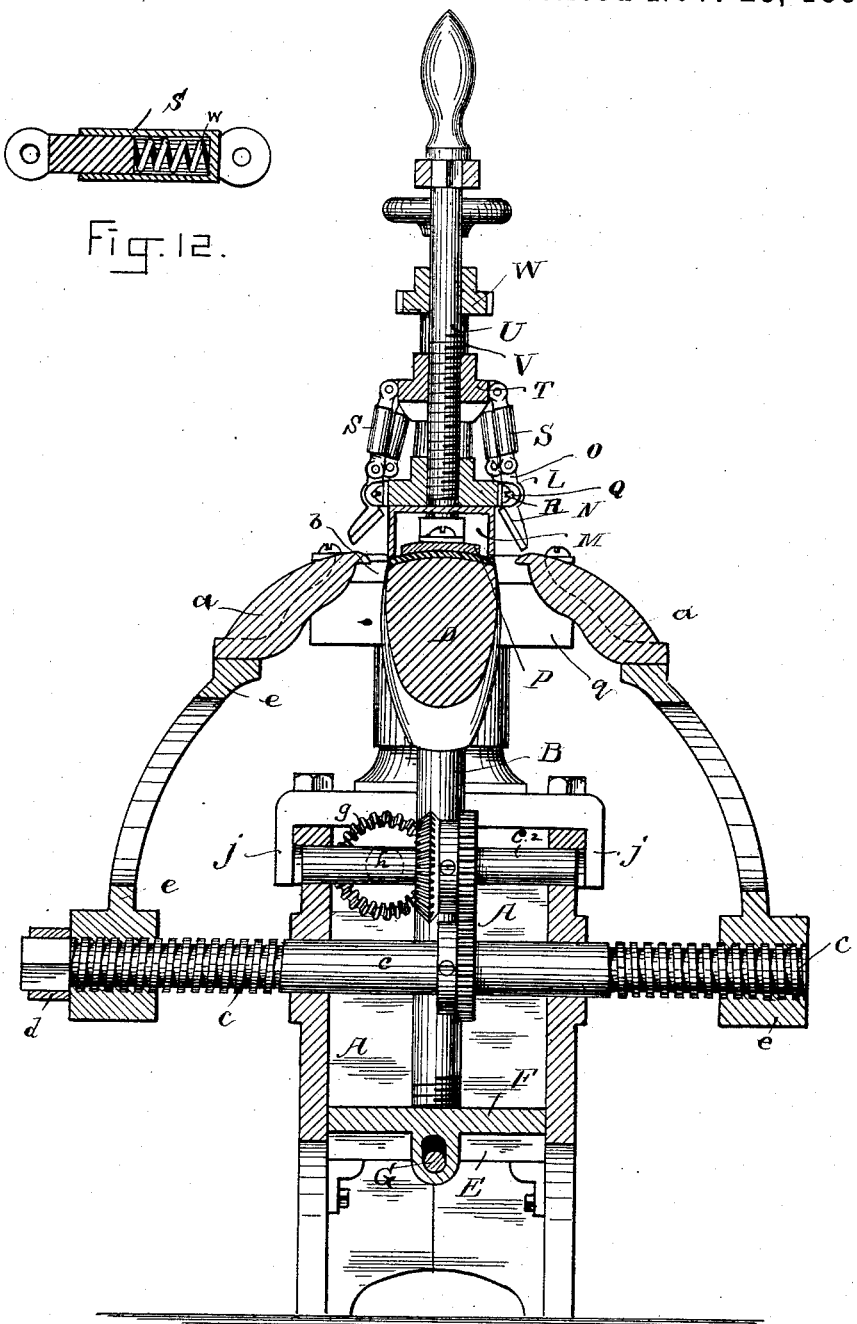
Figure 6:
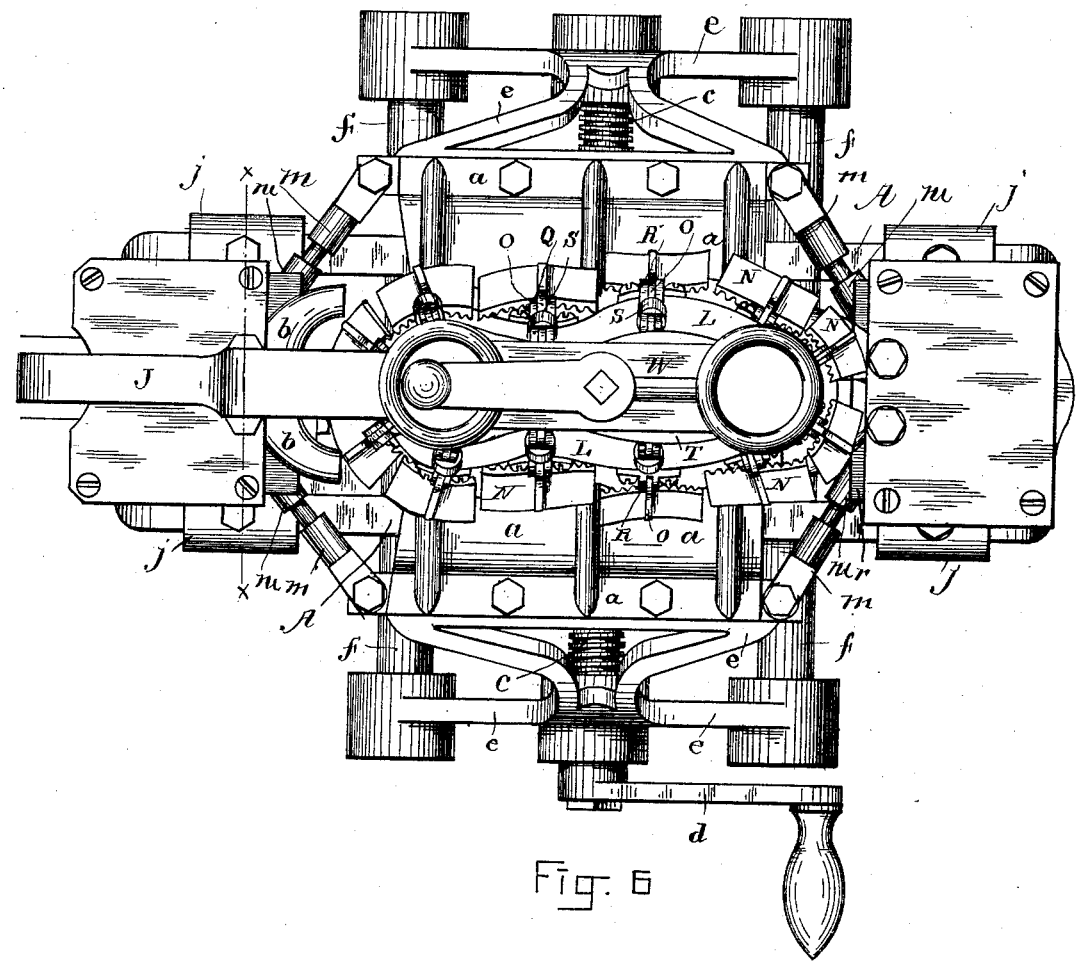
Figure 10:
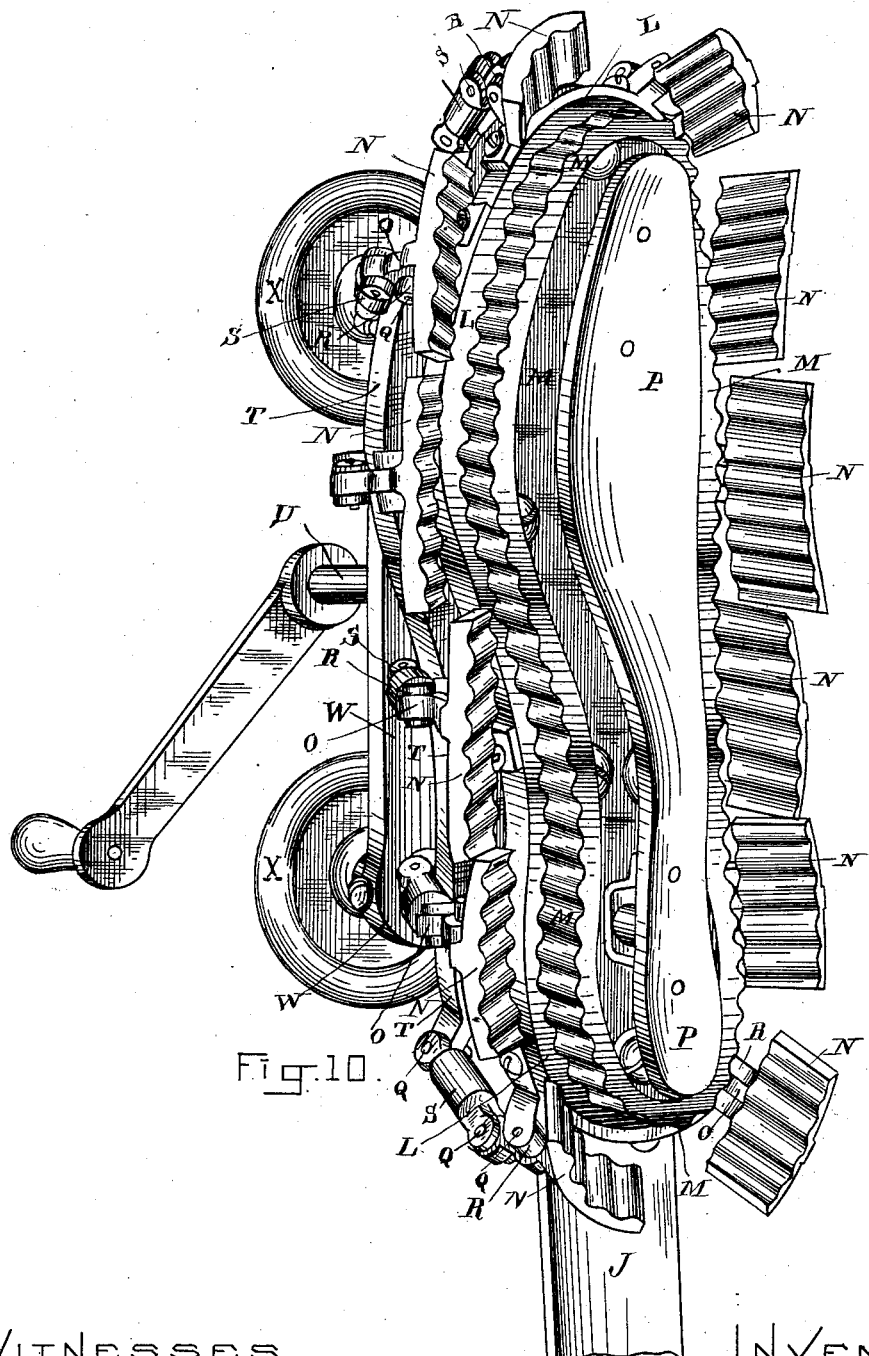

In the drawings, Figure 1 is a plan of the machine with the head shown broken away and inverted; Fig. 2, a side view with the head raised, as when introducing the last; Fig. 3, an enlarged side elevation with the head down in working position; Fig. 4, a vertical longitudinal section of the same; Fig. 5, a vertical transverse section; Fig. 6, a top plan of the machine in the position shown in Figs. 3, 4, and 5. Figs. 7 and 9 are details of pivoted clamp-jaws in vertical section; Fig. 8, a detail of the treadle; Fig. 10, a perspective view of the head raised vertically on its hinged arm, with the grippers thrown wide open; Figs. 11 and 12, sectional details of the connecting-links which actuate the clamp-jaws and the grippers.

A represents the base of the machine, preferably a rectangular shell cast in two equal parts, meeting at their ends in a vertical longitudinal central plane. This construction permits of a hollow interior, to receive many of the operative parts, and of surrounding walls, forming bearings in which the shafts and screws work and on which other of the parts are supported. The halves of the base are united by transverse bolts, and the whole is fixed firmly upon a solid bed in position for use.

From a suitable support within the hollow base A, I erect two standards, B C, to give a firm central support to the last D, on which the shoe-upper to be lasted is placed and held in any suitable manner. The standard B enters a vertical hole in the inverted last, to hold the heel portion against lateral or longitudinal motion, while the top of the standard C is concaved, allowing a slight lateral yield to the front end of the last, if desired, to provide for slight variations in the stock, &c., and avoid rigidity. These standards may have a slight vertical movement imparted to them, together or separately, to provide for variations in thickness of the insole or to give an increased pressure after the clamps have been moved into position, as will be explained. I prefer to effect this vertical movement by cams or wedges E, acting beneath a table, F, on which the standards B C are erected, and to actuate them by a rod and treadle, G, arranged to be worked by the foot of the operator, with a spring, H, to retract the same when pressure is released. (See Fig. 4.) The table F is furnished with vertical guides working in grooves inside of the body A.

The shoe-upper being in position upon the last inverted on the standards B C, the edges of the leather stand about vertically in position to be seized and drawn tightly around the last by the grippers and the pressure mechanism carried on the head I. This head is so mounted as to be readily moved into and out of place over the last, so as to bring it down to its working position, and, when desired, to raise, slide, or swing it away far enough to give free access to the last.

The head is shown mounted on a double-jointed arm, J, so as to turn up and remain temporarily in a raised position, to permit insertion and removal of the last with an upper upon it. I sometimes counterbalance the head by an equivalent weight on the opposite side of the pivot of its supporting-arm or one connected to the head direct by a cord and pulley.

The head consists, primarily, of a shell, L, approximately sole-shaped and supported by one of its ends on the arm J, such shell having projecting from its under face a sole-shaped flange, M, preferably made neither a right nor a left, but suitably shaped for either shoe. Co-operating with the flange are the grippers N and actuating mechanism, by which the edges of the upper leather are seized between the flange and grippers and drawn down taut over the last. The head carries also the presser-plate P, which fits upon the bottom of the insole along its central line and holds it firmly to the last, together with the mechanism by which this device is operated.

The grippers N are preferably corrugated on their inner faces, to conform to the exterior of the flange M and to increase their hold on the edges of the upper leather. Each gripper is formed with a projecting arm, O, through which a pivot, Q, passes to connect it to lugs R, formed on the edge of the shell L.

I provide for the simultaneous opening or closing of all the grippers as follows: The free end of each gripper-arm O is connected by an oblique pivoted link, S, with an actuating-plate, T, to which a rising-and-falling movement is imparted by a quick-threaded screw, U, working in a female thread in a central socket of the plate T. The point of this screw U is seated in the back of the shell L, so as to have only a rotary motion therein. Tubular studs V, projecting rigidly from the back of the shell L, serve as guides for the movement of the plate T. A cross-bar, W, connects the outer ends of the studs V and forms centrally a bearing for the stem of the screw U. Thus rotation of the screw raises or lowers the plate T and opens or closes the grippers N.

In order that the grippers may not hold the leather too tight, particularly about the heel, I sometimes make the links S in two parts, one sliding within the other, and in the socket place a short spiral spring, $w$, to give pressure without rigidity, as shown in detail, Fig. 12.

The presser-plate P is operated directly by screws X, working in female threads formed in the tubular studs V, a knob on the point of each screw engaging loosely with a loop on the back or upper side of said plate, so as to permit its adjustment to the varying conditions of the stock.

It is obvious that when the edges of the upper leather on the last are held by the grippers, and the plate P is screwed down against the bottom of the last, the upper will be drawn tightly around the last by the pressure of screws X, tending to raise the entire head. The employment of two distinct screws for this purpose is a material advantage, since pressure can be increased at the toe and lessened at the heel, or otherwise varied, as circumstances may require. The edges of the leather are now to be turned in over the last-bottom, and for this purpose I provide laterally-movable clamps $a$ at the sides and sliding and swinging clamp-jaws $b$ at the ends of the machine, all actuated simultaneously by the rotation of a single shaft, $c$, by means of a wheel or crank, $d$. The side clamps, $a$, are bolted to ledges $e$, and, like the jaws $b$, may be changed readily, according to the size or style of shoe to be lasted. For convenience in locating and assembling the parts, I sometimes employ a counter-shaft, $c^2$, and gears, as indicated in Figs. 4 and 5. The ledges $e$ are best moved toward and from the last by forming threaded sockets in their lower portions, to engage with right and left hand screw-threads on the shaft $c$, so that both shall approach or both recede from the last in unison. Suitable ways are desirable as guides in this movement, and for this purpose I fix projecting-pins $f$ in the sides of the body A of the machine to enter corresponding apertures in the ledges $e$. Collars on the shaft $c$ serve to retain it in its proper longitudinal position.

The bodily movement of the clamp-jaws $b$ toward and from the ends of the last may be effected by bevel-gears $g$, connecting the shaft $c$ with longitudinal shafts $h$, threaded for engagement with female threads in sliding blocks $j$, which are thereby moved on ways $i$, formed by the upper edges of the body A of the machine. These blocks have depending lips fitting beneath the undercut ways, to give stability and steadiness of movement.

On the sliding blocks $j$ are fixed two vertical studs, $k$, each surrounded, as in Figs. 4 and 7, by a sleeve, $l$, loose enough for a slight rotary movement, and furnished with a projecting arm. A pivoted connecting-rod, $m$, unites said arm with the ledge $e$, by which means the movement of said ledge toward and from the last gives a slight rotation to the sleeve.

The top of sleeve $l$ is provided with a gear or toothed segment, $o$, which meshes with the teeth of a straight rack, $p$, formed on or secured to the depending edges of a sliding shelf, $q$, (see Fig. 7,) whereby said shelf is reciprocated lengthwise of the machine while resting upon a fixed bracket, $r$, supported on the blocks $j$, by the tops of the studs $k$ or otherwise. The bracket $r$ has two vertical pins, $s$, (one of them being shown in Fig. 9,) which project upwardly through two straight longitudinal slots in the shelf $q$, and also through curved slots $t$, Fig. 1, in the outer portions of the swinging clamp-jaws $b$, which rest on said shelf and are pivoted to it at the points $u$ $u$, Fig. 7. Now, when the shelf is reciprocated over the bracket by the gear-connection or otherwise the clamp-jaws carried thereon will be closed by the movement toward the last and opened by the reverse movement, the curved slots *t* and fixed pins *s* necessitating this result. It is desirable that this closing-in movement of the jaws at the toe and heel should be completed slightly in advance of the completion of the stroke of the side clamps, *a*. This may be provided for in the shape given to the curved slots *t*; but I allow the lateral movement of clamps *a* to continue an instant after the jaws *b* have stopped, by making the connecting-rod *m* in two parts, one telescoping within the other, with an interposed spring, *v*, to take up the slack and to yield under the slight continued movement referred to.

The operation of the machine will be readily understood. The upper leather is placed upon the last in the usual way and held temporarily while the last is placed in position on the standards B C. The head I is then swung on its pivots and brought down to the last, with the upwardly-projecting edge of the leather between the flange M and the grippers N, which are spread to receive it. A turn of the screw U brings the several grippers to bear on the leather, holding it firmly against the flange. Turning down the screws X now causes the plate P to press against the bottom of the insole on the last, and stretches the upper at all points, the interposed springs or spring-links enabling the grippers to yield somewhat at the heel or elsewhere, as desired. The clamps *a b* are now to be moved inwardly to turn in the edges of the leather over the last-bottom, and when so seized and held by the clamps the last and its table is raised by the treadle mechanism, permitting the head to be released and turned up out of the way. By a hand-tool the wrinkles of the leather at the toe inside of the edges of the clamps are cut away to smooth the surface, after which an adhesive sheet is applied, instead of the usual tacks, to hold the upper permanently in place.

I claim as my invention—

1. The hollow base, the last-supporting standards contained therein, the treadle connected to said standards so that the last may be lifted thereby, as set forth, and the movable head supported above the last, substantially as shown and described.

2. In a lasting-machine, the combination, with the hollow base, of the inclosed table having last-supporting standards, the wedges for lifting said table, and the treadle and connections by which the table is lifted, substantially as stated.

3. The combination, with the last-supporting mechanism, of the laterally-movable side clamps and their operating-screw and the longitudinally-moving heel-and-toe clamps, the latter clamps closing by means of a rod connecting the side and toe clamps, said rod receiving its movement from the side clamps, as set forth.

4. The combination, with the last-supporting mechanism, of the head supported on a pivoted arm, the sole-shaped flange on said head, and the series of grippers and their actuating mechanism, substantially as described, whereby all the grippers are actuated to clasp the upper against said flange.

5. The combination, with the pivotally-supported head and the single sole-shaped flange, of the series of grippers, each gripper pivoted to the edge of the head, and the series of grippers provided with the mechanism for closing them simultaneously on the flange, substantially as described.

6. The combination, with the pivoted head-plate L, of the tubular studs V, the presser-plate P, operated by screws passing through the tubular studs, and the gripper-actuating plate T, guided on said tubular studs, substantially as described.

7. The combination, with the last-supporting mechanism, of the laterally-movable clamps *a* at the sides of the last and the swinging clamp-jaws *b* at the ends of the last, the swinging jaws connected with the sliding jaws by a connecting-rod, substantially as described.

8. The combination, with the last-supporting mechanism and the longitudinally-movable blocks *j*, of the rocking sleeves *l*, supported on said blocks, the mechanism by which said sleeves are separately oscillated, and the clamp-jaws actuated by said oscillation of the sleeve, substantially as described.

9. In a lasting-machine, the vertical studs *k*, with loose sleeves *l* and gears *o* thereon, and the connecting-rods *m*, in combination with the sliding shelf *q*, having rack *p* engaging with said gears, and the pivoted reciprocating clamp-jaws *b*, positively actuated by a slot-and-pin connection, substantially as set forth.

In testimony whereof I have signed my name to this specification, in the presence of two subscribing witnesses, on this 14th day of June, A. D. 1886.

JOHN H. LASKEY.

Witnesses:
A. H. SPENCER,
ELIHU C. LOOMIS.